Patented Mar. 13, 1934

1,950,389

UNITED STATES PATENT OFFICE 1,950,389

TREATMENT OF LEAD SOFTENER DROSSES

Jesse Oatman Betterton and Robert Archibald Crites, Omaha, Nebr., and Henry Paul Wagner, Gravesend, England, assignors to American Smelting and Refining Company, New York, N. Y., a corporation of New Jersey No Drawing. Application February 18, 1932, Serial No. 593,864

1 Claim. (Cl. 75—15)

This invention relates to the metallurgy of lead and particularly to certain steps in the process of softening lead bullion. The invention is more especially concerned with the treatment of the oxidized and other impurities variously termed drosses, slags, and skims and used interchangeably throughout this specification and the appended claims, resulting from the softening process and has particular reference to the reduction of such material while still on the molten softening bath prior to skimming and subsequent treatment.

The invention further relates to a treatment for drosses, slags or skims formed during the lead softening process whereby silver values may be eliminated and retained in the bath with a resulting simplification in the treatment of the softener skims after they have been removed from the bath.

As is well known, lead as it comes from the smelting furnace, contains many impurities and, therefore, the impure bullion is subjected to a "softening" process whereby most of these impurities are removed. In general, the process consists of heating the bullion in the furnace whereby the impurities having a greater affinity for oxygen than lead are oxidized and collect on the surface of the bath from which they are subsequently skimmed from the bath. These resulting softener skims may be further treated for recovery of values contained therein and it is with treatments resulting in the separation and recovery of such values that our invention is concerned.

There is, of course, a wide variation in the composition of softener slags and drosses due to differences in the original ores and softener treatments but such elements as arsenic, tin and antimony are very common and of major importance because not only must they be eliminated to obtain refined lead of proper quality, but also because of their detrimental effects in desilverization processes. Hence, for the production of refined lead and also from the standpoint of desilverization, these impurities must be eliminated, but at the same time the recovery of values from such removed impurities is an important consideration. The problem is rendered more acute because in the oxidation or softening process, appreciable amounts of silver and/or gold, if they are present, tend to become intermingled or mixed with the oxidized impurities.

The usual method of treating softener skims is reduction in the blast furnace to antimonial lead, but because of the silver and/or other precious metal values generally present in the skim, an intermediate treatment must be practised before the final reduction in the blast furnace. This intermediate step of partially reducing the lead in the dross or slag to carry down the silver and any small amounts of gold present is an expensive operation and is eliminated by our invention. We have discovered a method of treating the molten skim before removing it from the bath, whereby the ensuing reduction will devalue the skim to such low limits that after removal it may be directly smelted, thus eliminating what has been an essential, costly step in the prior art.

In utilizing our invention, lead bullion may be charged into a softening furnace or kettle in any well known manner and heat applied to the bath. Our invention is not limited to any exact procedure during the oxidation stage but the general softening steps, such as maintaining the bullion at a proper temperature, agitating the bath to hasten oxidation, etc. are contemplated.

When the softening action has reached the point where normally the skims would be made, or, in other words, when oxidation has sufficiently progressed, our invention is applied. Instead of skimming at this point, we treat the dross or slag while still on the bath with a reducing agent, preferably in the form of a carbonaceous fuel. An agent we have found to be well adapted for this purpose is finely divided oil coke. The coke may be sprayed or blown over the surface of the bath with an air gun or added in any other similar manner and is then preferably rabbled into the slag to secure an intimate mixture and reaction. The direct result of this procedure is to reduce the amount of silver in the slag to very low limits, often to less than 1 oz. per ton and also to remove any small amounts of gold or other precious metals. This, in turn, enables the remaining impurities to be skimmed from the bath and directly smelted to antimonial lead. The silver and other precious metal values thus removed from the slag or dross reenter the bath proper which already contains the remaining amounts of such elements originally present in the bullion.

We have found that coke additions giving the best results are 3% to 5% of the weight of the dross or slag, depending upon its grade at the time of reduction. As a specific example of the amount of oil coke required for each charge of bullion, we have had satisfactory results with only 750 lbs. of oil coke to each charge of 200 tons bullion where the bullion contained 1.30% antimony, .09% arsenic and .07% tin.

As soon as the reduction on the bath is completed, the remaining impurities are skimmed from the bath whereupon the skim may be directly smelted to antimonial lead as the reduction on the bath has eliminated the silver and other precious metals to discard limits. This direct smelting of the skim may be accomplished in any suitable standard type furnace as those skilled in the art will readily understand.

Although we have specified petroleum coke as a suitable reducing agent in practising our invention, it is well to point out that other reducing fuels may be used. In fact, any coke fines or coal fines may be used, but generally speaking, fuels with a low final ash are to be preferred as a large ash content tends to increase the viscosity of the slag or dross as well as increase the melting point, both of which are undesirable characteristics.

Not only do we materially reduce the cost of smelting the skims by eliminating the need of an intermediate treatment for the removal of silver and/or other precious metal values, but we also produce skims higher in impurities than by other methods. With bullion of the grade described above, namely, 1.3% antimony, .09% arsenic and .07% tin, we are able to produce skims which, after reduction on the bath, analyze from 34% to 35% total arsenic, antimony and tin in about the same relative ratios as they were present in the bullion.

What is claimed is:

The method of treating argentiferous lead bullion containing impurities, such as antimony, arsenic and tin, which comprises charging said bullion to a lead softening furnace, heating the charge to form a molten bath, subjecting said bath to oxidizing conditions thereby concentrating impurities in a dross, treating said dross in situ with a carbonaceous reducing agent in quantities sufficient to reduce lead oxide in said dross in amounts adequate to carry and return the silver in the dross to the bath proper without reducing substantial amounts of the impurities such as antimony, arsenic and tin to the metallic state said reducing treatment being conducted at relatively low temperatures whereby fuming of the impurities in the dross is prevented and thereafter separating the argentiferous lead from the drossed impurities.

JESSE OATMAN BETTERTON.
ROBERT ARCHIBALD CRITES.
HENRY PAUL WAGNER.